United States Patent [19]

Lo et al.

[11] Patent Number: 4,562,096

[45] Date of Patent: Dec. 31, 1985

[54] HEAT-CURABLE SILICONE COMPOSITIONS, USE THEREOF AND STABILIZER THEREFOR

[75] Inventors: Peter Y. K. Lo; LeRoy E. Thayer, both of Midland; Antony P. Wright, Mills Township, Midland County, all of Mich.

[73] Assignee: Dow Corning Corporation, Midland, Mich.

[21] Appl. No.: 685,507

[22] Filed: Dec. 24, 1984

[51] Int. Cl.$^4$ .......................... C08G 77/12; B05D 5/10
[52] U.S. Cl. ................................ 427/208.8; 427/387; 427/395; 525/478; 528/15; 528/31; 528/32; 560/198
[58] Field of Search ..................... 525/478; 528/15, 31; 427/208.8, 387

[56] References Cited

U.S. PATENT DOCUMENTS

Re. 31,727 11/1984 Eckberg .............................. 525/478
4,448,815 5/1984 Grenoble et al. ................... 525/478

*Primary Examiner*—Wilbert J. Briggs, Sr.
*Attorney, Agent, or Firm*—George A. Grindahl

[57] ABSTRACT

Organosilicon compositions which cure by way of a metal-catalyzed reaction of silicon-bonded hydroxyl radicals and/or silicon-bonded olefinic hydrocarbon radicals with silicon-bonded hydrogen atoms are stabilized for hours at room temperature by the incorporation of a hydrocarbonoxyalkyl maleate. However, the stabilized compositions are rapidly curable at low elevated temperature. Liquid organopolysiloxane compositions of this invention are particularly useful for coating operations, particularly paper coating operations to prepare an adhesive-releasing layer.

28 Claims, No Drawings

HEAT-CURABLE SILICONE COMPOSITIONS, USE THEREOF AND STABILIZER THEREFOR

BACKGROUND OF THE INVENTION

The present invention relates to compositions which cure by way of a platinum group metal catalyzed reaction of silicon-bonded hydroxyl radicals and/or silicon-bonded olefinic hydrocarbon radicals with silicon-bonded hydrogen atoms. More specifically, the present invention relates to such curable compositions wherein the room temperature catalytic activity of the platinum group metal catalyst has been greatly inhibited by the presence of an inhibitor component.

Organosilicon compositions in which a platinum group metal catalyst is inhibited in its cure-promoting activity at room temperature by the presence of a catalyst inhibitor are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. No. 3,445,420; ethylenically unsaturated isocyanates, U.S. Pat. No. 3,882,083; olefinic siloxanes, U.S. Pat. No. 3,989,667; unsaturated hydrocarbon diesters, U.S. Pat. No. 4,256,870; and conjugated eneynes, U.S. Pat. Nos. 4,465,818 and 4,472,563; other organic compounds such as hydroperoxides, sulfoxides, amines, phosphines, phosphites and nitriles; and various metal salts.

While the known platinum group metal catalyst inhibitors are effective for delaying or preventing the room temperature cure of organosilicon compositions which cure by way of a platinum group metal catalyzed reaction, a long-standing problem with the use of such inhibitors still remains.

A continuing problem with inhibited, platinum group metal catalyzed organosilicon compositions is that the cure time and/or the cure temperature of the composition is undesirably increased by the use of an inhibitor. While it is desirable to inhibit or prevent the room temperature cure of such a composition, it is rarely desirable to inhibit the cure of the composition at elevated temperature. This problem is of particular significance for applications where the organosilicon composition is used to rapidly coat a substrate, such as is practiced in the adhesive release coating art.

In the coatings art, such as the paper coating art, the coating composition that is used to coat a substrate should not gel before it has been applied to the substrate; however, it should rapidly cure thereafter, preferably with only a moderate amount of added energy. This means that the coating compositions preferably should not react at ambient temperature for as long as eight hours but should fully cure in less than a few minutes when heated.

The present invention provides organosilicon compositions which have improved room temperature stability and elevated temperature cure rate and which are particularly useful in the coatings art. An inhibitor having unusually stable performance is also provided.

BRIEF SUMMARY OF THE INVENTION

It is an object of this invention to provide improved curable organosilicon compositions. It is also an object of this invention to provide organopolysiloxane compositions which do not cure at room temperature for long periods of time but which cure rapidly when formed into a desired shape and heated to low elevated temperatures. It is a particular object of this invention to provide liquid organopolysiloxane coating compositions which remain liquid for hours at temperatures up to 104° F. (40° C.) but which cure within 90 seconds when coated onto a substrate and heated to a temperature of as low as 180° F. (82° C.). It is a further object of this invention to provide an inhibitor for a platinum group metal catalyzed organopolysiloxane composition which will provide for the composition both room temperature cure inhibition and a short elevated temperature cure time which does not drift, i.e., change, as the curable composition ages.

These objects, and others which will occur to one of ordinary skill in the curable organosilicon composition art upon considering the following disclosure and appended claims, are obtained by the compounds, compositions and method of the present invention which, briefly stated, involves incorporating into a curable organosilicon composition comprising silicon-bonded hydrogen atoms and silicon-bonded radicals reactive therewith, in the presence of a platinum group metal catalyst, an effective amount of a hydrocarbonoxyalkyl maleate inhibitor component, preferably bis(2-methoxyisopropyl) maleate.

DETAILED DESCRIPTION OF THE INVENTION

The present invention relates, in one aspect, to a curable composition obtained by homogeneously mixing components comprising (A) an organosilicon component having an average of from one to three silicon-bonded monovalent radicals per silicon atom selected from the group consisting of hydroxyl radicals, hydrocarbon radicals, aliphatically saturated halohydrocarbon radicals and cyanoalkyl radicals, there being an average of at least two monovalent radicals, per molecule of Component (A), selected from the group consisting of hydroxyl radicals and olefinic hydrocarbon radicals, the remaining silicon valences thereof being satisfied by divalent radicals, free of aliphatic unsaturation, selected from the group consisting of oxygen atoms, hydrocarbon radicals, hydrocarbon ether radicals, halohydrocarbon radicals and halohydrocarbon ether radicals, said divalent radicals linking silicon atoms, (B) an organosilicon component containing at least two silicon-bonded hydrogen atoms per molecule of Component (B) and an average of from one to two silicon-bonded monovalent radicals per silicon atom selected from the group consisting of cyanoalkyl radicals, hydroxyl radicals and aliphatically saturated hydrocarbon and halohydrocarbon radicals, the remaining silicon valences thereof being satisfied by divalent radicals, free of aliphatic unsaturation, selected from the group consisting of oxygen atoms, hydrocarbon radicals, hydrocarbon ether radicals, halohydrocarbon radicals and halohydrocarbon ether radicals, said divalent radicals linking silicon atoms, (C) an amount of a platinum group metal-containing catalyst component sufficient to accelerate a reaction of said silicon-bonded olefinic hydrocarbon and/or hydroxyl radicals with said silicon-bonded hydrogen atoms at room temperature, and (D) an amount of a hydrocarbonoxyalkyl maleate sufficient to retard said reaction at room temperature, but insufficient to prevent said reaction at elevated temperature, said hydrocarbonoxyalkyl maleate having the formula

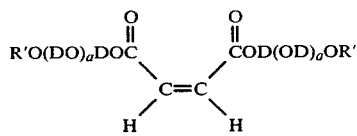

wherein each R' denotes, independently, a monovalent hydrocarbon radical having from 1 to 6 carbon atoms, each D denotes, independently, an alkylene radical having from 2 to 4 carbon atoms and each a has an average value of from 0 to about 5; the amounts of Components (A) and (B) being sufficient to provide a ratio of the number of silicon-bonded hydrogen atoms to the number of silicon-bonded olefinic hydrocarbon radicals plus silicon-bonded hydroxyl radicals of from 1/100 to 100/1.

Herein the term "curable", as applied to compositions, denotes a chemical change which leads to an increase in the molecular weight of the composition. Said increase in molecular weight, typically, is accompanied by an increase in the viscosity of the curable composition. For most uses of the compositions of this invention the term curable denotes a change from the liquid or formable state to the solid or gelled state for the composition.

The curing of the compositions of this invention is accomplished by a platinum group metal catalyzed reaction between silicon-bonded hydroxyl radicals of Component (A) and silicon-bonded hydrogen atoms of Component (B) and/or between silicon-bonded olefinic hydrocarbon radicals of Component (A) and silicon-bonded hydrogen atoms of Component (B), the former reaction being a condensation reaction leading to the formation of siloxane bonds and hydrogen gas and the latter reaction being an addition reaction leading to silcarbane bonds.

Component (A) of the compositions of this invention can be any organosilicon compound containing two or more silicon atoms linked by divalent radicals and containing an average of from 1 to 3 silicon-bonded monovalent radicals per silicon, with the proviso that the organosilicon compound contains at least two silicon-bonded radicals selected from hydroxyl radicals and olefinic hydrocarbon radicals. This component can be a solid or a liquid, freely flowing or gum-like.

Examples of said divalent radicals linking silicon atoms in Component (A) include oxygen atoms, which provide siloxane bonds, and aliphatically saturated hydrocarbon, hydrocarbon ether, halohydrocarbon ether and halohydrocarbon radicals which provide silcarbane bonds. The divalent radicals can be the same or different, as desired.

Examples of suitable divalent hydrocarbon radicals include alkylene radicals, such as

—CH$_2$—, —CH$_2$CH$_2$—, —CH$_2$CHCH$_3$—, —(CH$_2$)$_4$—,

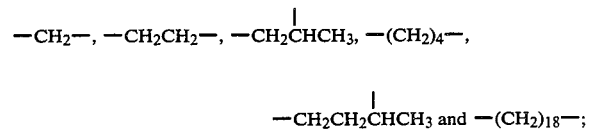

cycloalkylene radicals, such as

arylene radicals, such as

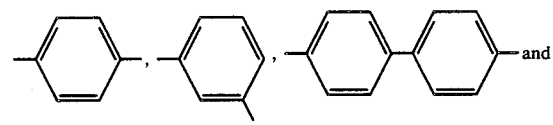

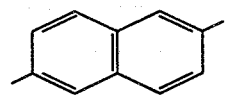

and combinations of hydrocarbon radicals, such as

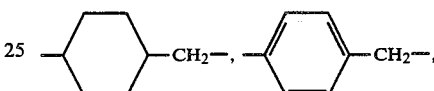

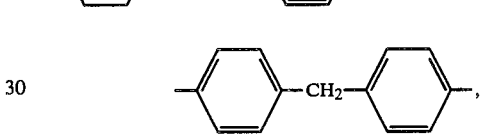

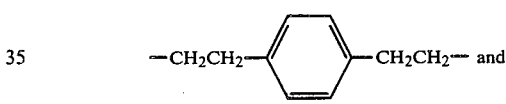

Examples of suitable divalent halohydrocarbon radicals include any divalent hydrocarbon radical wherein one or more hydrogen atoms have been replaced by halogen, such as fluorine, chlorine or bromine. Preferably the halogen atom is not located on an aliphatic carbon atom which is adjacent to, or 1 carbon removed from, silicon. Preferable divalent halohydrocarbon radicals have the formula —CH$_2$CH$_2$C$_n$F$_{2n}$CH$_2$CH$_2$— wherein n has a value of from 1 to 10 such as, for example, —CH$_2$CH$_2$CF$_2$CF$_2$CH$_2$CH$_2$—.

Examples of suitable divalent hydrocarbon ether radicals and halohydrocarbon ether radicals include —CH$_2$CH$_2$OCH$_2$CH$_2$—, —CH$_2$CH$_2$CF$_2$OCF$_2$CH$_2$CH$_2$—,

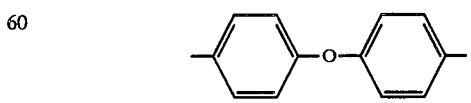

and —CH$_2$CH$_2$CH$_2$OCH$_2$CH$_2$CH$_2$—.

Examples of said monovalent radicals in Component (A) include hydroxyl radicals, hydrocarbon radicals, aliphatically saturated halohydrocarbon radicals and cyanoalkyl radicals.

Examples of suitable monovalent hydrocarbon radicals include alkyl radicals, such as $CH_3-$, $CH_3CH_2-$,

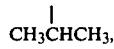

$C_8H_{17}-$, $C_{10}H_{21}-$ and $C_{20}H_{41}-$; cycloaliphatic radicals, such as cyclohexyl; aryl radicals, such as phenyl, tolyl, xylyl, anthracyl and xenyl; aralkyl radicals, such as benzyl and 2-phenylethyl; and olefinic hydrocarbon radicals, such as vinyl, allyl, methallyl, butenyl, hexenyl, octenyl, cyclohexenyl and styryl. Alkenyl radicals are preferably terminally unsaturated. Typical monovalent hydrocarbon radicals are methyl, phenyl and vinyl.

Examples of suitable aliphatically saturated monovalent halohydrocarbon radicals include any monovalent hydrocarbon radical which is free of aliphatic unsaturation and has at least one of its hydrogen atoms replaced with halogen, such as fluorine, chlorine or bromine. Preferably the halogen atom is not located in an aliphatic carbon atom which is adjacent to, or 1 carbon removed from, silicon. Preferable monovalent halohydrocarbon radicals have the formula $C_nF_{2n+1}CH_2CH_2-$ wherein n has a value of from 1 to 10, such as, for example, $CF_3CH_2CH_2-$.

Examples of suitable cyanoalkyl radicals include $NCCH_2CH_2-$ and $NCCH_2CH_2CH_2-$.

It is preferred that Component (A) of the compositions of this invention possess flowability at low temperature and degradative stability at high temperature. Therefore it is preferred that Component (A) have at least 50 percent siloxane structure, i.e., at least 50 percent of said divalent radicals linking silicon atoms are oxygen atoms. It is highly preferable that all of the divalent radicals linking silicon atoms are oxygen atoms, thereby providing a highly preferred Component (A), i.e., organopolysiloxanes.

Organopolysiloxanes suitable for use as Component (A) have the average unit formula $R_c''SiO_{(4-c)/2}$ wherein $R''$ denotes said monovalent radicals noted above and c has a value of from greater than 0 to 3. Suitable siloxane units in the organopolysiloxanes having the above general formula are siloxane units having the formulae $R_3''SiO_{\frac{1}{2}}$, $R_2''SiO_{2/2}$, $R''SiO_{3/2}$ and $SiO_{4/2}$. Said siloxane units can be combined in any molecular arrangement such as linear, branched, cyclic and combinations thereof, to provide organopolysiloxanes that are useful as Component (A).

A preferred organopolysiloxane Component (A) for the composition of this invention is a substantially linear organopolysiloxane having the formula $X_2RSiO(XRSiO)_xSiRX_2$. By substantially linear it is meant that the component contains, at most, only trace amounts of silicon atoms bearing 3 or 4 siloxane linkages. It is to be understood that the term substantially linear also encompasses organopolysiloxanes which can contain up to about 15 percent by weight cyclopolysiloxanes which are frequently coproduced with the linear organopolysiloxanes.

In the formula shown immediately above each R denotes an aliphatically saturated monovalent hydrocarbon or halohydrocarbon radical having from 1 to 20 carbon atoms and being exemplified above. The several R radicals can be the same or different, as desired. Additionally, each X denotes a hydroxyl radical, an R radical or an olefinic hydrocarbon radical, preferably having from 2 to 8 carbon atoms and being exemplified above. Of course, at least 2 X radicals are either olefinic hydrocarbon radicals, preferably vinyl, or hydroxyl radicals. To insure linearity of an organopolysiloxane having the above formula no more than two silicon-bonded hydroxyl radicals should be present in the molecule. Finally the value of the subscript x is such that the organopolysiloxane Component (A) has a viscosity at 25° C. of from 100 millipascal-seconds (100 centipoise) to 100 kilopascal-seconds (100,000,000 centipoise and more). The exact value of x needed to provide a viscosity value falling within said limits depends upon the identity of the X and R radicals; however, for hydroxyl-terminated and/or hydrocarbyl-terminated polydimethylsiloxane x will have a value of from about 60 to about 10,000.

In terms of preferred monovalent hydrocarbon radicals, noted above, examples of linear organopolysiloxanes of the above formula which are suitable as Component (A) for the composition of this invention include $HOMe_2SiO(Me_2SiO)_xSiMe_2OH$, $PhMeViSiO(Me_2SiO)_xSiPhMeVi$, $HOMe_2SiO(Me_2SiO)_{0.9x}(MeViSiO)_{0.1x}-SiMe_2OH$, $HOMe(CF_3CH_2CH_2)SiO(-Me(CF_3CH_2CH_2)SiO)_xSiMe(CF_3CH_2CH_2)OH$, $ViMe_2SiO(Me_2SiO)_{0.95x}(MeViSiO)_{0.05x}SiMe_2Vi$, $Me_3SiO(Me_2SiO)_{0.9x}-(MeViSiO)_{0.1x}SiMe_3$, $PhMeViSiO(-Me_2SiO)_{0.8x}(MePhSiO)_{0.1x}(Ph_2SiO)_{0.1x}-SiPhMeVi$ and $ViMe_2SiO(Me_2SiO)_xSiMe_2Vi$ wherein Me, Vi and Ph denote methyl, vinyl and phenyl, respectively.

Highly preferred linear organopolysiloxanes (A) for the composition of this invention have the formula $X_2RSiO(Me_2SiO)_b-(MeViSiO)_dSiRX_2$ wherein R and X are as noted above and the sum of b plus d is equal to x, also noted above. The values of the subscripts b and d can be zero or greater; however, the sum of b plus d has a value of from about 60 to about 10,000 and the value of b is typically greater than the value of d.

In a preferred embodiment of the present invention, wherein the curable composition, preferably solventless, is used to coat a solid substrate, such as paper, with an adhesivereleasing coating, Component (A) has the formula shown immediately above wherein the value of b plus d is sufficient to provide a viscosity at 25° C. for the Component (A) of from 100 mPa.s, to about 100 Pa.s, preferably from about 100 mPa.s to 10 Pa.s and, most preferably, from 100 mPa.s to 5 Pa.s; said viscosities corresponding approximately to values of b +d of from 60 to 1000, preferably from 60 to 520 and, most preferably, from 60 to 420. In addition, the value of subscript d is preferably limited to less than 0.1 b such as zero, 0.02 b or 0.08 b.

Component (B) of the compositions of this invention can be any organosilicon compound containing two or more silicon atoms linked by divalent radicals and containing an average of from one to two silicon-bonded monovalent radicals per silicon atom and an average of at least two, and preferably three or more, silicon-bonded hydrogen atoms per molecule thereof.

Examples of said divalent radicals linking silicon atoms in Component (B) are as delineated above for Component (A), including preferred examples. As with Component (A), the divalent radicals within Component (B) can be the same or different, as desired. Furthermore, the divalent radicals that are present in Component (B) can, but need not, be the same as the divalent radicals that are present in Component (A).

Examples of said monovalent radicals in Component (B) include hydroxyl radicals, cyanoalkyl radicals and aliphatically saturated hydrocarbon and halohydrocarbon radicals, as delineated above for Component (A), including preferred examples. The monovalent radicals that are present in Component (B) can, but need not, be the same as the monovalent radicals that are present in Component (A).

Component (B) must contain an average of at least two silicon-bonded hydrogen atoms per molecule thereof. Preferably Component (B) contains an average of three or more silicon-bonded hydrogen atoms such as, for example, 5, 10, 20, 40 and more.

As with Component (A), Component (B) preferably contains at least 50 percent, and most preferably 100 percent, siloxane structure, thereby providing a highly preferred Component (B), i.e., organopolysiloxanes.

Organopolysiloxanes suitable for use as Component (B) have the average unit formula $R_3''H_fSiO_{(4-e-f)/2}$ wherein $R''$ denotes said monovalent radical and the sum of e plus f has a value of from greater than 0 to 3. Preferably the value of f does not exceed 1. Suitable siloxane units in the organopolysiloxanes having the above general formula are siloxane units having the formulae $R_3''SiO_{\frac{1}{2}}$, $R_2''HSiO_{\frac{1}{2}}$, $R_2''SiO_{2/2}$, $R''HSiO_{2/2}$, $R''SiO_{3/2}$, $HSiO_{3/2}$ and $SiO_{4/2}$. Said siloxane units can be combined in any molecular arrangement such as linear, branched, cyclic and combinations thereof, to provide organopolysiloxanes that are useful as Component (B).

A preferred organopolysiloxane Component (B) for the compositions of this invention is a substantially linear organopolysiloxane having the formula $YR_2SiO(YRSiO)_ySiR_2Y$ wherein each R denotes an aliphatically saturated monovalent hydrocarbon or halohydrocarbon radical having from 1 to 20 carbon atoms and being exemplified above. The several R radicals can be the same or different, as desired. Additionally each Y denotes a hydrogen atom or an R radical. Of course, at least 2 Y radicals must be hydrogen atoms. Finally, the value of the subscript y is such that the organopolysiloxane Component (B) has a viscosity at 25° C. of from 1 to 100 millipascal-seconds. The exact value of y needed to provide a viscosity value falling within said limits depends upon the number and identity of the R radicals; however, for organopolysiloxanes containing only methyl radicals as R radicals y will have a value of from about 1 to about 100.

In terms of preferred monovalent hydrocarbon radicals, noted above, examples of linear organopolysiloxanes of the above formula which are suitable as Component (B) for the compositions of this invention include $HMe_2SiO(Me_2SiO)_ySiMe_2H$, $(CF_3CH_2CH_2)MeHSiO(Me(CF_3CH_2CH_2)SiO)_ySiHMe(CH_2CH_2CF_3)$, $Me_3SiO(MeHSiO)_ySiMe_3$, $HMe_2SiO(Me_2SiO)_{0.5y}(MeHSiO)_{0.5y}SiMe_2H$, $HMe_2SiO(Me_2SiO)_{0.5y}(MePhSiO)_{0.1y}(MeHSiO)_{0.4y}SiMe_2H$, $Me_3SiO(Me_2SiO)_{0.4y}(MeHSiO)_{0.6y}SiMe_3$, $(MeHSiO)_y$, $(HMe_2SiO)_4Si$ and $MeSiO(SiMe_2H)_3$.

Highly preferred linear organopolysiloxane (B) for the compositions of this invention have the formula $YR_2SiO(Me_2SiO)_p—(MeHSiO)_qSiR_2Y$ wherein Y and R have the meaning noted and exemplified above and the sum of p plus q is equal to y, also noted above. The values of p and q can be zero or greater; however the sum of p plus q has a value of from 1 to about 100 and the value of q is typically greater than the value of p.

The amounts of Components (A) and (B) that are used in the compositions of this invention are not narrowly limited. Said amounts, typically expressed in terms of the ratio of the number of silicon-bonded hydrogen atoms of Component (B) to the number of silicon-bonded hydroxyl and/or olefinic hydrocarbon radicals of Component (A), are sufficient to provide a value of from 1/100 to 100/1 for said ratio. Of course, the extent of molecular weight increase is directly related to the extent that the value of said ratio approaches 1/1.

For the liquid coating compositions of this invention which are to be used in the coating method of this invention, hereinbelow delineated, the value of said ratio should have a value of from $\frac{1}{2}$ to 1.5/1, and preferably about 1/1.

Organosilicon polymers are, of course, well known in the organosilicon art. Organopolysiloxanes are clearly the most significant and most widely used form of organosilicon polymers, in the art and in this invention; many are commercially prepared. The preparation of the organosilicon components that are used in the compositions of this invention is well documented and needs no intensive delineation herein.

Briefly, organopolysiloxanes are typically prepared by way of hydrolysis and condensation of hydrolyzable silanes such as $Me_2SiCl_2$, $Me_3SiCl$, $MeSiCl_3$, $SiCl_4$, $Me_2Si(OMe)_2$, $MeSi(OMe)_3$ and $Si(OCH_2CH_3)_4$ or by way of acid- or alkali-catalyzed siloxane equilibration of suitable siloxane precursors such as $(Me_2SiO)_4$ and $Me_3SiOSiMe_3$, which themselves are prepared by way of said hydrolysis and condensation reaction.

Organopolysiloxane Component (A) can be prepared as noted above with the proviso that a silane or siloxane containing at least one silicon-bonded olefinic hydrocarbon radical is used, alone or in conjunction with other silanes or siloxanes, in sufficient amount to provide the necessary number of olefinic hydrocarbon radicals in the organopolysiloxane. Examples of olefinic hydrocarbon radical-containing silanes or siloxanes include $ViMe_2SiCl$, $MeViSiCl_2$, $ViSiCl_3$, $(MeViSiO)_4$ and $ViMe_2SiOSiMe_2Vi$.

Organopolysiloxane Component (B) can be prepared as noted above with the proviso that a silane or siloxane containing at least one silicon-bonded hydrogen atom, instead of olefinic hydrocarbon radical, is used, alone or in combination with other silanes or siloxanes, in sufficient amount to provide the necessary number of silicon-bonded hydrogen atoms in the organopolysiloxane. Examples of hydrogen atom-containing silanes or siloxanes include $HMe_2SiCl$, $HMeSiCl_2$, $HSiCl_3$, $HMe_2SiOSiMe_2H$ and $(MeHSiO)_4$. Component (B) is preferably prepared under nonalkaline conditions.

Organosilicon polymers having silcarbane and siloxane structure can be prepared, for example, from monomeric species that have nonoxygen divalent radicals, such as

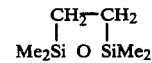

or $ClMe_2SiC_6H_4SiMe_2Cl$, using standard siloxane bond-forming chemistry and incorporating one or more of the olefinic hydrocarbon radicals or hydrogen atom-containing silanes or siloxanes noted above, and other silanes or siloxanes, as desired.

Organosilicon polymers which contain no siloxane bonds can be prepared, for example, by a hydrosilylation reaction between silanes or silcarbanes bearing silicon-bonded olefinically unsaturated hydrocarbon radicals, such as $Vi_2SiMe_2$ or $ViMe_2SiC_6H_4SiMe_2Vi$ and silanes or silcarbanes bearing silicon-bonded hydrogen atoms, such as $H_2SiMe_2$ or $HMe_2SiC_6H_4SiMe_2H$.

Other suitable methods for preparing the organosilicon components that are used in the compositions of this invention also occur in the organosilicon art.

Component (C) of the composition of this invention is a catalyst component which facilitates the reaction of the silicon-bonded hydrogen atoms of Component (B) with the silicon-bonded hydroxyl and/or silicon-bonded olefinic hydrocarbon radicals of Component (A) and can be any platinum group metal-containing catalyst component. By platinum group it is meant herein ruthenium, rhodium, palladium, osmium, iridium and platinum. Component (C) can be a platinum group metal; a carrier, such as silica gel or powdered charcoal, bearing a platinum group metal; or a compound or complex of a platinum group metal.

Component (C) is preferably a platinum-containing catalyst component since they are most widely used and available and because they provide a more favorable effect for the compositions of this invention in terms of pot life and cure time, as hereinafter discussed.

A preferred platinum-containing catalyst component in the compositions of this invention is a form of chloroplatinic acid, either as the commonly available hexahydrate form or as the anhydrous form, because of its easy dispersibility in organosilicon systems. A particularly useful form of chloroplatinic acid is that composition obtained when it is reacted with an aliphatically unsaturated organosilicon compound such as divinyltetramethyldisiloxane, as disclosed by U.S. Pat. No. 3,419,593 incorporated herein by reference.

The amount of platinum group metal-containing catalyst component that is used in the compositions of this invention is not narrowly limited as long as there is a sufficient amount to accelerate a room temperature reaction between the silicon-bonded hydrogen atoms of Component (B) with the silicon-bonded hydroxyl and/or olefinic hydrocarbon radicals of Component (A). The exact necessary amount of said catalyst component will depend upon the particular catalyst and is not easily predictable. However, for chloroplatinic acid said amount can be as low as one part by weight of platinum for every one million parts by weight of organosilicon Components (A) plus (B). Preferably said amount is at least 10 parts by weight, on the same basis.

For compositions of this invention which are to be used in the coating method of this invention the amount of platinum-containing catalyst component to be used is sufficient to provide from 10 to 500 parts by weight platinum per one million parts by weight of organopolysiloxane Components (A) plus (B).

Component (D) of the compositions of this invention is a hydrocarbonoxyalkyl maleate having the formula cis-R′O(DO)$_a$DO$_2$CCH═CHCO$_2$D(OD)$_a$OR′. The term hydrocarbonoxyalkyl denotes an alkyl radical which is substituted with a hydrocarbonoxy radical or with a hydrocarbonoxyalkyleneoxy radical or with a hydrocarbonoxypolyalkyleneoxy radical. That is to say, the value of subscript a in the formula immediately above can have any value equal to or greater than zero. As a practical matter the value of a should not exceed a value of about 5, when the inhibiting effect of the hydrocarbonoxyalkyl maleate is considered. The values of both a's can be the same or different, as desired.

The hydrocarbon radical, i.e., the R′ radical, in the above formula has from 1 to 6 carbon atoms and can be, for example, an alkyl radical such as methyl, ethyl, propyl, isopropyl, butyl, pentyl or hexyl; an aryl radical such as phenyl; an alkenyl radical such as vinyl or allyl; or a cyclohydrocarbon radical such as cyclohexyl.

In the above formula for the hydrocarbonoxyalkyl maleate each D denotes, independently, an alkylene radical having from 2 to 4 carbon atoms such as

—CH$_2$CH$_2$—, —CH$_2$CHCH$_3$, —CH$_2$CH$_2$CH$_2$—,

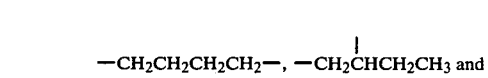

—CH$_2$CH$_2$CH$_2$CH$_2$—, —CH$_2$CHCH$_2$CH$_3$ and

—CH$_2$CH$_2$CHCH$_3$.

The individual D radicals can be the same or different, as desired.

In terms of ease of preparation and of the inhibiting effect in the compositions of this invention a preferred group of hydrocarbonoxyalkyl maleates are the bis(2-alkoxyethyl) maleates, such as cis-CH$_3$OCH$_2$CH$_2$O$_2$CCH═CHCO$_2$CH$_2$CH$_2$OCH$_3$; the bis(2-alkoxyethoxyethyl) maleates, such as cis-CH$_3$OCH$_2$CH$_2$OCH$_2$CH$_2$O$_2$CCH═CHCO$_2$CH$_2$CH$_2$OCH$_2$CH$_2$OCH$_3$; and the bis(2-alkoxyisopropyl) maleates, such as cis-CH$_3$OCH$_2$CH(CH$_3$)O$_2$CCH═CHCO$_2$CH(CH$_3$)CH$_2$OCH$_3$. We have shown that several members of this group of hydrocarbonoxyalkyl maleates are very effective as cure inhibitors, i.e., viscosity stabilizers, at room temperature in the composition of this invention while allowing the rapid curing of said compositions at low elevated temperatures.

A novel compound, bis(2-methoxyisopropyl) maleate, has been found to have the desirable ability to provide a commercially useful inhibiting effect at room temperature for certain coating compositions of this invention without increasing, i.e., inhibiting, the cure time of said coating composition at low elevated temperature.

Hydrocarbonoxyalkyl maleates can be prepared by any known method. For example, symmetrical hydrocarbonoxyalkyl maleates can be prepared by the full esterification of maleic acid, maleic anhydride or maleyl chloride with a suitable alcohol, such as CH$_3$OCH$_2$CH$_2$OH, CH$_2$═CHCH$_2$OCH$_2$CH$_2$OH, CH$_3$OCH$_2$CH(CH$_3$)OH or CH$_3$O(CH$_2$CH$_2$O)$_2$H. Asymmetrical hydrocarbonoxyalkyl maleates can be prepared, for example, by the half esterification of maleic anhydride, using a first alcohol, such as CH$_3$OCH$_2$CH(CH$_3$)OH, followed by full esterification of the resulting half acid ester with a second alcohol, such as CH$_2$═CHCH$_2$OCH$_2$CH(CH$_3$)OH to give rise, for example, to cis-CH$_2$═CHCH$_2$OCH$_2$CH(CH$_3$)O$_2$CCH═CHCO$_2$CH(CH$_3$)CH$_2$OCH$_3$.

The amount of hydrocarbonoxyalkyl maleate to be used in the compositions of this invention is not critical and can be any amount that will retard the above-described catalyzed reaction at room temperature while not preventing said reaction at low elevated temperature. While not wishing to be limited by any theory we believe that there should be at least one molecule of hydrocarbonoxyalkyl maleate for each platinum group metal atom in the composition, to form a room temperature stable complex therebetween. Preferably a large excess of hydrocarbonoxyalkyl maleate molecules compared to platinum group metal atoms is used.

In the liquid organopolysiloxane compositions that are used in the coating method of this invention the amount of hydrocarbonoxyalkyl maleate is typically sufficient to provide from 25 to 50 molecules thereof for every platinum atom in the composition.

The addition of the Component (D) to a composition comprising (A), (B) and (C) slows down the rate of cure at room temperature over long periods of time, but at temperatures in excess of 70° C. the inhibiting effect of the hydrocarbonoxyalkyl maleate observed at room temperature disappears and a faster curing rate is realized. The cure of the curable composition can be retarded at room temperature for short periods of time or for very long periods of time by the proper amount of hydrocarbonoxyalkyl maleate. No exact amount of hydrocarbonoxyalkyl maleate can be suggested to give a specified storage life at room temperature. The rate of cure will depend upon the ratio of hydrocarbonoxyalkyl maleate to platinum, the form of the platinum catalyst, the nature of the hydrocarbonoxyalkyl maleate, the nature and amounts of Components (A) and (B) and the presence or absence of other nonessential ingredients. Hydrocarbonoxyalkyl maleates added in small amounts such as 0.1 weight percent based on the weight of the curable composition provide increased pot life in all systems, but, in most cases, do not fully retard the reaction at room temperature. In larger amounts such as 3 weight percent hydrocarbonoxyalkyl maleate, they provide completely inhibited cures at room temperature. However, some systems are inhibited at room temperature at one mol of hydrocarbonoxyalkyl maleate to one mol of platinum while others may require 10, 20, 50 or 1000 moles of hydrocarbonoxyalkyl maleate per one mole of platinum to inhibit the system at room temperature. The amount of hydrocarbonoxyalkyl maleate is therefore dependent upon the desired use, and the nature of the system. The skilled worker should therefore determine the optimum level for each system.

The composition of this invention can contain any of the optional components commonly used in platinum group metalcatalyzed organosilicon compositions, such as fillers, solvents, surfactants, colorants, stabilizers and physical property modifiers.

Examples of fillers useful in the compositions of this invention include reinforcing fillers and extending fillers. Examples of reinforcing fillers include: silica, such as fume silica and precipitated silica; and treated silica, such as fume or precipitated silica that has been reacted with e.g., an organohalosilane, a disiloxane, or a disilazane.

Examples of extending fillers include crushed quartz, aluminum oxide, aluminum silicate, zirconium silicate, magnesium oxide, zinc oxide, talc, diatomaceous earth, iron oxide, calcium carbonate, clay, titania, zirconia, mica, glass, such as ground glass or glass fiber, sand, carbon black, graphite, barium sulfate, zinc sulfate, wood flour, cork, fluorocarbon polymer powder, rice hulls, ground peanut shells, and the like.

Examples of said solvents include aliphatic hydrocarbons, such as pentane, hexane, heptane, octane, nonane and the like; aromatic hydrocarbons such as benzene, toluene and xylene; alcohols such as methanol, ethanol, and butanol; ketones such as acetone, methylethyl ketone and methyl-isobutyl ketone; and halogenated solvents such as fluorine-, chlorine-, and bromine-substituted aliphatic or aromatic hydrocarbons, such as trichloroethane, perchloroethylene, bromobenzene and the like. Two or more solvents may be used together.

Examples of stabilizers include antimicrobial preparations, mildewcides, antioxidants, flame retardants and ultraviolet radiation stabilizers.

Examples of physical property modifiers include adhesion promoters, crosslinking agents and controlled release additives, such as the siloxane resins disclosed in U.S. Pat. No. 3,527,659.

The compositions of this invention are made by homogeneously mixing Components (A), (B), (C) and (D), and any optional components, using suitable mixing means, such as a spatula, a drum roller, a mechanical stirrer, a three-roll mill, a sigma blade mixer, a bread dough mixer, and a two-roll mill.

The order of mixing Components (A) to (D) is not critical; however, it is preferred that Components (B) and (C) be brought together in the presence of Component (D), most preferably in a final mixing step. Thus, it is possible to mix all components in one mixing step immediately prior to the intended use of the curable composition. Alternatively, certain components can be premixed to form two or more packages which can be stored, if desired, and then mixed in a final step immediately prior to the intended use thereof.

It is preferred to mix Components (C), (D) and a portion of Component (A), along with certain optional components such as fillers and solvents, to provide a first package and Component (B), along with the remaining portion of Component (A), if any, to provide a second package. These two packages can then be stored until the composition of this invention is desired and then homogeneously mixed.

It is also possible to place Components (B), (C) and (D) in three separate packages and to place Component (A) in one or more of said separate packages and the three packages stored until needed.

The compositions of this invention have utility as formable compositions to provide organosilicon articles such as O-rings, tubing, wire-coating and gaskets; as encapsulent and sealant compositions; and as coating compositions, among others.

In another aspect the present invention relates to a process for rendering a solid surface less adherent to materials that normally adhere thereto, said process comprising (I) applying to said solid surface a coating of a liquid curable composition comprising (A) a substantially linear organopolysiloxane component containing at least two silicon-bonded radicals per molecule thereof selected from the group consisting of olefinic hydrocarbon radicals and hydroxyl radicals and having the formula $X_2RSiO(Me_2SiO)_b(MeViSiO)_dSiRX_2$ wherein Me denotes methyl, Vi denotes vinyl, each R denotes, independently, an aliphatically saturated monovalent radical having from 1 to 20 carbon atoms selected from the group consisting of hydrocarbon radicals and halohydrocarbon radicals, each X denotes, independently, a monovalent radical selected from the group consisting of R radicals, vinyl radicals and hydroxyl radicals and b and d have average values such that the value of b plus d is sufficient to provide a viscosity at 25° C. of from 100 millipascal-seconds to 100 pascal-seconds for Component (A), (B) a substantially linear organopolysiloxane component containing at least two silicon-bonded hydrogen atoms per molecule thereof and having the formula $YR_2SiO(Me_2SiO)_p(MeHSiO)_qSiR_2Y$ wherein each Y denotes, independently, R or H, R is as denoted above and p and q have average values such that the value of p plus q is sufficient to provide a viscosity at 25° C. of from 1 to 100 millipascalseconds for Component (B), (C) an amount of a platinum-containing catalyst component sufficient to accelerate a reaction of said silicon-bonded vinyl and/or hydroxyl radicals with said silicon-bonded hydrogen atoms at room temperature, and (D) an amount of a hydrocarbonoxyalkyl maleate sufficient to retard said reaction at room temperature, but insufficient to prevent said reaction at elevated temperature, said hydrocarbonoxyalkyl maleate having the formula

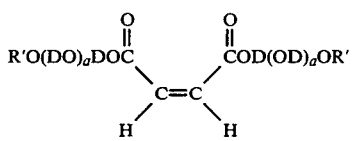

wherein each R' denotes, independently, a monovalent hydrocarbon radical having from 1 to 6 carbon atoms, each D denotes, independently, an alkylene radical having from 2 to 4 carbon atoms and each a has an average value of from 0 to about 5, the amounts of Components (A) and (B) being sufficient to provide a ratio of the number of silicon-bonded hydrogen atoms to the number of silicon-bonded vinyl radicals plus silicon-bonded hydroxyl radicals of from $\frac{1}{2}$ to 1.5/1, and (II) heating the applied coating for a period of time sufficient to cure the applied coating.

In the process of this invention the liquid curable composition comprises Components (A), (B), (C) and (D) which are delineated above, including preferred embodiments thereof. The amounts of Components (A), (B), (C) and (D) that are used in the coating compositions of this invention are also stated above.

In the process of this invention the liquid curable organopolysiloxane composition is coated onto a solid substrate, preferably at room temperature, and thereafter heated to effect a cure of the coating. The coating process can be accomplished by any suitable manner known in the art, such as by spreading, brushing, extruding, spraying and rolling. A significant characteristic of the liquid curable compositions of this invention is the long pot life that they have, wherein the viscosity thereof does not double in value over a period of several hours, thereby allowing an extended application time.

In a preferred embodiment of the instant process the solid substrate is paper. Other suitable solid substrates that can be coated by the process of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form the solid substrate can be sheetlike, such as adhesive release liner, textiles and foil; or substantially three-dimensional in form.

After the liquid curable composition has been coated onto a substrate it is heated to convert the liquid coating to the nonliquid state. Another significant characteristic of the process of this invention is the rapid curing that occurs when the coated composition is heated to low elevated temperatures, such as 70° C. Typically, the coated composition will cure fully when heated, for example, at 82° C. for 90 seconds. Higher heating temperatures, such as up to 160° C., will provide correspondingly shorter curing times.

In a preferred embodiment of the process of this invention a flexible sheet material, such as paper, metal foil or tapestock, is coated with a thin coating of the liquid curable composition, preferably in a continuous manner, and the thus-coated material is then heated to rapidly cure the coating, to provide a sheetlike material bearing on at least one surface thereof an adhesive-releasing coating. The adhesive-releasing coating is subsequently brought into contact with a pressure sensitive adhesive, preferably in a continuous manner to form an article having a peelable adhesive/coating interface. Examples of such an article include, adhesive labels having a peelable backing, adhesive tape in roll form and adhesive packaged in a strippable container.

The process of this invention is applicable to adhesive materials, other than pressure sensitive adhesives. Examples of said adhesive materials include foods, asphalt and gum polymers.

The following examples are disclosed to further teach, but not limit, the invention which is properly delineated by the appended claims.

All amounts (parts and percentages) are by weight unless otherwise indicated. Viscosities were measured with a rotating spindle viscometer.

Bath life of a composition means the time interval required for the viscosity of the composition to reach a value of two times the room temperature viscosity of the freshly prepared composition.

Cure time for a composition means the time interval required for the composition, when coated onto S2S kraft paper, at the thickness of 1 pound per ream, to attain the no smear, no migration, no rub-off condition.

The no smear condition was determined by lightly streaking the coating with a finger and observing for the absence of haze in the streaked area.

The no migration condition was determined by firmly adhering a common, pressure sensitive adhesive tape to the coating, removing the tape and folding the removed tape together, adhesive surfaces to each other. Absence of migration of the coating to the tape was indicated by noting that the doubled tape was as difficult to separate as unused tape so doubled.

The no rub-off condition was determined by vigorously rubbing the coating with the index finger and noting that the coating could not be removed from the paper.

The hydrocarbonoxyalkyl maleates disclosed herein were prepared by the reaction of maleic acid with the appropriate alcohol. A water-azeotroping solvent and concentrated $H_2SO_4$ were also used to conduct the esterification reaction. Following removal of water of esterification by azeotropic distillation the reaction product was washed with 10% aqueous $NaHCO_3$ and then with water and then dried. The hydrocarbonoxyalkyl maleate was isolated by vacuum distillation, except where noted.

For example, bis(2-methoxyethyl) maleate was prepared in 78.5% yield from 11.6 parts of maleic acid, 20 parts of $CH_3OCH_2CH_2OH$ in 200 parts of toluene and a catalytic amount of concentrated $H_2SO_4$. B.p.=138°-9° C./0.9 Torr.

In the case of the hydrocarbonoxyalkyl maleate based on $CH_2=CHCH_2(OCH_2CH)_{2.5}OH$ the product was not distilled but was only freed of volatile materials by vacuum distillation. Some alcohol remained in the hydrocarbonoxyalkyl maleate. Contrastingly, the hydrocarbonoxyalkyl maleate based on $CH_3CH_2(OCH_2CH_2)_2OH$ was distilled; B.p.=187°-190° C./0.9 Torr.

Bis(2-methoxyisopropyl) maleate was prepared from 23 parts of maleic acid, 60 parts of 1-methoxy-2-propanol, 100 parts of toluene and a trace of concentrated sulfuric acid. The esterification reaction was conducted at reflux under a Dean-Stark water trap for 8 hours. The hydrocarbonoxyalkyl maleate was isolated by vacuum distillation in 73% yield. B.p.=127°–130° C./0.09 Torr.

EXAMPLES 1 TO 7

Two hundred fifty parts of a dimethylvinylsiloxy-terminated polydimethyl-co-methylvinylsiloxane having a viscosity of about 300 mPa.s (300 cP) and a vinyl content of about 1.2% were mixed with 4.75 parts of a platinum-containing catalyst containing about 0.6% Pt (114 ppm Pt, based on 300 mPa.s polymer) and consisting of $H_2PtCl_6.6H_2O$ dissolved in tetramethyldivinyldisiloxane, 1.25 parts of bis(2-methoxyethyl) maleate and 11.75 parts of an organohydrogenpolysiloxane crosslinker containing $(CH_3)_3SiO_{\frac{1}{2}}$ units, $(CH_3)_2SiO_{2/2}$ units and $CH_3(H)SiO_{2/2}$ units and having a silicon-bonded hydrogen content of about 1.1%. The bath life of the resulting composition of this invention at room temperature was 118 hours. The bath life of the same composition, except not containing an inhibitor, was less than 30 minutes at room temperature. This experiment was repeated with six other hydrocarbonoxyalkyl maleates having the general formula cis-R'O(DO)$_a$DO$_2$CCH=CHCO$_2$D(OD)$_a$OR'. The results are summarized in Table I.

TABLE I

| Example | R'O(DO)$_a$D- | Amount, parts | Bath Life, hours at 25° C. |
|---|---|---|---|
| 1 | CH$_3$OCH$_2$CH$_2$- | 1.25 | 118 |
| 2 | CH$_3$CH$_2$OCH$_2$CH$_2$- | 1.25 | 70 |
| 3 | CH$_3$(CH$_2$)$_3$OCH$_2$CH$_2$- | 1.875 | 96 |
| 4 | CH$_3$OCH$_2$CHCH$_3$ | 1.25 | 17 |
| 5 | CH$_3$(OCH$_2$CH$_2$)$_2$- | 1.55 | 2.5 |
| 6 | CH$_3$CH$_2$(OCH$_2$CH$_2$)$_2$- | 1.25 | 24 |
| 7 | CH$_2$=CHCH$_2$(OCH$_2$CHCH$_3$)$_{2.5}$ | 2.50 | 1 |
| Control* | No maleate | — | <0.5 |

*Not a composition of this invention

EXAMPLES 8–11

The experiment of Example 1 was repeated except the amount of the bis(2-methoxyethyl) maleate was varied. The resulting compositions of this invention were tested for bath life at 40° C. and for cure time at 180° F. (82° C.), initially and at full bath age. The results are summarized in Table II. These examples illustrate the effect of the amount of oxyalkylene maleate on the bath life and cure time of the composition of this invention.

TABLE II

| Example | Maleate, parts | Bath Life Hours at 40° C. | Cure Time, seconds at 180° F. Initial | Aged |
|---|---|---|---|---|
| 8 | 1.25 | >10 | 70 | 90 |
| 9 | 1.125 | 7.5 | 50 | 65 |
| 10 | 1.0 | 7 | 40 | 55 |
| 11 | 0.875 | 4.5 | 35 | 55 |

EXAMPLE 12

A mixture of 250 parts of the vinyl-containing polymer having a viscosity of about 300 mPa.s, 11.9 parts of the organohydrogenpolysiloxane crosslinker, 4 parts of the platinumcontaining catalyst, all described in Example 1, 2.5 parts of cyclopolymethylvinylsiloxanes and 1.28 parts of bis(2-methoxyethyl) maleate was found to have an initial 180° F. cure time of 80 seconds, a viscosity after 24 hours at room temperature of 1.25 times the original viscosity and a 40° C. bath life of 6.5 hours.

For comparison a composition identical to the above composition, but containing diethyl maleate instead of bis(2-methoxyethyl) maleate, was prepared. Its 180° F. cure time was 70 seconds but its viscosity after 24 hours at room temperature was 5.7 times the original viscosity.

For further comparison a composition identical to the above composition, but containing 0.2 part of 3,5-dimethyl-3-hydroxy-1-hexyne instead of bis(2-methoxyethyl) maleate, was prepared. Its 180° F. cure time was 60 seconds; however, after 24 hours at room temperature it had gelled.

This example illustrates the superior viscosity stability of the compositions of this invention compared to compositions of the art.

EXAMPLE 13

A mixture of 250 parts of the vinyl-containing polymer having a viscosity of about 300 mPa.s, 4 parts of the platinumcontaining catalyst, both described in Example 1, 2.5 parts of cyclopolymethylvinylsiloxane, 16.25 parts of a liquid silicone resin crosslinker prepared by the method of U.S. Pat. No. 4,310,678 and having an SiH content of 0.77% and an SiOH content of 1.36% and 2.25 parts of bis(2-methoxyisopropyl) maleate was prepared. The resulting composition of this invention had a bath life at room temperature of greater than 24 hours. The same composition, but without the bis(2-methoxyisopropyl) maleate, gelled in 10 minutes at room temperature.

This example illustrates the compositions of this invention comprising a linear vinyl-containing siloxane fluid and a resinous organohydrogenpolysiloxane crosslinker.

EXAMPLE 14

A mixture of 250 parts of a vinyldimethylsiloxy-terminated polydimethylsiloxane having a viscosity of about 2 Pa.s (2,000 cP) and a vinyl content of about 0.25%, 0.3 part of the platinum-containing catalyst of Example 1, 3.85 parts of Me$_3$SiO(Me$_2$SiO)$_3$(MeHSiO)$_5$SiMe$_3$ crosslinker, 3.2 parts of bis(2-methoxyisopropyl) maleate and 98.8 parts of trimethylsiloxy-treated silica filler was prepared. The composition of this invention was stable at 50° C. for 3 months and cured to an elastomeric composition in 10 minutes when heated to 150° C. The identical composition, but without the bis(2-methoxyisopropyl) maleate, was not stable and gelled within 3 minutes at 50° C.

This example illustrates a composition of this invention comprising a particulate filler.

EXAMPLE 15

A mixture of 250 parts of a blend of a silanol-terminated polydimethylsiloxane gum having a number average molecular weight of about 270,000 and a silanol-terminated polydimethylsiloxane fluid having a silanol content of about 1.4%, 3.4 parts of the platinum-containing catalyst of Example 1, 11.9 parts of Me$_3$SiO(MeHSiO)$_{35}$SiMe$_3$ crosslinker, 591 parts of xylene and 17.1 parts of bis(2-methoxyisopropyl) maleate was prepared. The resulting composition of this invention experienced no change in viscosity at room temperature for 7 days and no gel formation after 2.5 months. The same composition, but without the bis(2-methoxyisopropyl) maleate, gelled within 2 minutes at room temperature.

The above composition of this invention, 200 parts, was diluted with 800 parts of toluene and the diluted solution was coated onto S2S kraft paper. When heated to 300° F. (149° C.) the coating cured to a no smear, no migration, no rub-off condition in 70 seconds.

This example illustrates a composition of this invention comprising a silanol-containing organopolysiloxane and an organohydrogenpolysiloxane crosslinker.

EXAMPLE 16

A mixture of 250 parts of the vinyl-containing polymer described in Example 1, 10.1 parts of the crosslinker described in Example 15, 1.1 parts of bis(2-methoxyethyl) maleate and 2.1 parts of a rhodium-containing catalyst containing 97% toluene and 3% RhCl$_3$(n-Bu$_2$S)$_2$ was prepared. The resulting composition of this invention, when heated at 104° F. (40° C.) for 6 hours, experienced a 1.4-fold increase in viscosity. The same composition, but not containing the bis(2-methoxyethyl) maleate, experienced an 11-fold increase in viscosity when heated at 110° F. (43° C.) for the same length of time.

This example shows the inhibiting effect of the hydrocarbonoxyalkyl maleate inhibitor in a rhodium-catalyzed curable composition.

EXAMPLES 17-19

The experiment of Example 4 was repeated except the amount of bis(2-methoxyisopropyl) maleate was varied. The viscosity, initially and after 8 hours at 40° C., and the 180° F. cure time, initially and after 8 hours at 40° C., were measured for the resulting compositions of this invention. The results, shown in Table III, illustrate the stable 180° F. (82° C.) cure time of the compositions of this invention which contain the novel bis(2-methoxyisopropyl) maleate after being held at 40° C. for 8 hours.

A comparison of Examples 17, 18 and 19 with Examples 11, 10 and 8, respectively, shows that the use of bis(2-methoxyethyl) maleate provides a shorter cure time than the use of bis(2-methoxyisopropyl) maleate; however, the latter hydrocarbonoxyalkyl maleate provides a stable cure rate throughout the life of the bath whereas the former hydrocarbonoxyalkyl maleate does not provide this stability.

TABLE III

| Property | Example No. | | |
|---|---|---|---|
| | 17 | 18 | 19 |
| Maleate, parts | 0.9 | 1.0 | 1.2 |
| Initial | | | |
| Viscosity, mPa · s | 325 | 300 | 300 |
| 180° F. Cure, sec. | 60 | 70 | 75 |
| After 8 hours @ 40° C. | | | |
| Viscosity, mPa · s | 625 | 450 | 388 |
| 180° F. Cure, sec. | 60 | 70 | 75 |

EXAMPLE 20

A coating bath containing 551 parts of toluene, 3226 parts of heptane, 250 parts of a dimethylvinylsiloxy-terminated polydimethyl-co-methylvinylsiloxane gum containing 2 mol percent vinyl radicals and having a number average molecular weight of about 260,000, 2.9 parts of the platinum-containing catalyst described in Example 1, 2.4 parts of cyclopolymethylvinylsiloxane, 4 parts of the organohydrogenpolysiloxane crosslinker described in Example 15 and 2.4 parts of bis(2-methoxyisopropyl) maleate was prepared and a portion thereof immediately coated onto S2S kraft paper using No. 12 Mayer Rod. The immediately coated paper was placed in a forced-air oven at 170° F. for 80 seconds to cure the coated composition to a no smear, no migration, no rub-off condition. The coating bath was allowed to stand for 17 hours at room temperature and the paper coating process was repeated. The delay-coated composition cured to the same condition in 60 seconds in a 200° F. forced-air oven.

When the above paper coating process was repeated with the same composition, except containing no hydrocarbonoxyethyl maleate the immediately coated composition cured in 40 seconds at 170° F.; however, the delay-coated composition would not cure to a no rub-off condition when heated for 120 seconds at 200° F.

The ability of the composition of this invention to cure to the no rub-off condition after being aged at room temperature for a period indicates bath stability thereof.

EXAMPLE 21

Example 20 was repeated using 2.5 parts of bis(2-phenoxyethyl) maleate instead of 2.4 parts of bis(2-methoxyisopropyl) maleate. Similar results were obtained. That is, the control composition was not stable to two hours of aging while the composition of this invention was stable beyond five hours of aging.

That which is claimed is:

1. A curable composition obtained by homogeneously mixing components comprising
   (A) an organosilicon component having an average of from one to three silicon-bonded monovalent radicals per silicon atom selected from the group consisting of hydroxyl radicals, hydrocarbon radicals, aliphatically saturated halohydrocarbon radicals and cyanoalkyl radicals, there being an average of at least two monovalent radicals per molecule of Component (A), selected from the group consisting of hydroxyl radicals and olefinic hydrocarbon radicals, the remaining silicon valences thereof being satisfied by divalent radicals, free of aliphatic unsaturation, selected from the group consisting of oxygen atoms, hydrocarbon radicals, hydrocarbon ether radicals, halohydrocarbon ether radicals and halohydrocarbon radicals, said divalent radicals linking silicon atoms,
   (B) an organosilicon component containing at least two silicon-bonded hydrogen atoms per molecule of Component (B) and an average of from one to two silicon-bonded monovalent radicals per silicon atom selected from the group consisting of cyanoalkyl radicals, hydroxyl radicals and aliphatically saturated hydrocarbon and halohydrocarbon radicals, the remaining silicon valences thereof being satisfied by divalent radicals, free of aliphatic unsaturation, selected from the group consisting of oxygen atoms, hydrocarbon radicals, hydrocarbon ether radicals, halohydrocarbon ether radicals and halohydrocarbon radicals, said divalent radicals linking silicon atoms, (C) an amount of a platinum group metal-containing catalyst component sufficient to accelerate a reaction of said silicon-bonded olefinic hydrocarbon and/or hydroxyl radicals with said silicon-bonded hydrogen atoms at room temperature, and
(D) an amount of a hydrocarbonoxyalkyl maleate sufficient to retard said reaction at room temperature but insufficient to prevent said reaction at elevated temperature, said hydrocarbonoxyalkyl maleate having the formula

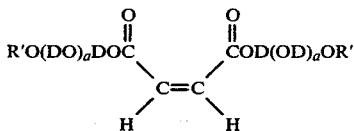

wherein each R' denotes, independently, a monovalent hydrocarbon radical having from 1 to 6 carbon atoms, each D denotes, independently, an alkylene radical having from 2 to 4 carbon atoms and each a has an average value of from 0 to 5, the amounts of Components (A) and (B) being sufficient to provide a ratio of the number of silicon-bonded hydrogen atoms to the number of silicon-bonded olefinic hydrocarbon radicals plus silicon-bonded hydroxyl radicals of from 1/100 to 100/1.

2. A composition according to claim 1 wherein the hydrocarbonoxyalkyl maleate is selected from the group consisting of bis(2-alkoxyethyl) maleates, bis(2-alkoxyethoxyethyl) maleates and bis(2-alkoxyisopropyl) maleates.

3. A composition according to claim 2 wherein the platinum group metal-containing catalyst component is a platinum-containing catalyst component.

4. A composition according to claim 3 wherein Components (A) and (B) are organopolysiloxanes wherein the organic radicals thereof are said silicon-bonded monovalent radicals.

5. A composition according to claim 4 wherein the hydrocarbonoxyalkyl maleate is bis(2-methoxyisopropyl) maleate.

6. A composition according to claim 1 wherein the divalent radicals of Components (A) and (B) are oxygen atoms.

7. A composition according to claim 6 wherein the platinum group metal-containing catalyst component is a platinum-containing catalyst component.

8. A composition according to claim 7 wherein the hydrocarbonoxyalkyl maleate is selected from the group consisting of bis(2-alkoxyethyl) maleates, bis(2-alkoxyethoxyethyl) maleates and bis(2-alkoxyisopropyl) maleates.

9. A composition according to claim 8 wherein the ratio of the number of silicon-bonded hydrogen atoms to the silicon-bonded olefinic hydrocarbon radicals plus silicon-bonded hydroxyl radicals has a value of from $\frac{1}{2}$ to 1.5/1.

10. A composition according to claim 9 wherein Component (A) is a substantially linear organopolysiloxane having the formula $X_2RSiO(XRSiO)_xSiRX_2$ wherein each R denotes, independently, an aliphatically saturated monovalent radical having from 1 to 20 carbon atoms selected from the group consisting of hydrocarbon radicals and halohydrocarbon radicals, each X denotes, independently, a monovalent radical selected from the group consisting of R radicals, olefinic hydrocarbon radicals having from 2 to 8 carbon atoms and hydroxyl radicals and x has a value sufficient to provide a viscosity at 25° C. of at least 100 millipascal-seconds for the Component (A).

11. A composition according to claim 10 wherein Component (B) is a substantially linear organopolysiloxane having the formula $YR_2SiO(YRSiO)_ySiR_2Y$ wherein R is as defined in claim 10, each Y denotes, independently, an R radical or a hydrogen atom and y has a value sufficient to provide a viscosity at 25° C. of from 1 to 100 millipascal-seconds for the Component (B).

12. A composition according to claim 11 wherein the hydrocarbonoxyalkyl maleate is bis(2-methoxyisopropyl) maleate.

13. A composition according to claim 6 wherein Component (A) is a substantially linear organopolysiloxane having the formula $X_2RSiO(Me_2SiO)_b(MeViSiO)_dSiRX_2$ wherein Me denotes methyl, Vi denotes vinyl, each R denotes, independently, an aliphatically saturated monovalent radical having from 1 to 20 carbon atoms selected from the group consisting of hydrocarbon radicals and halohydrocarbon radicals, each X denotes, independently, a monovalent radical selected from the group consisting of R radicals, vinyl radicals and hydroxyl radicals and b and d have average values such that the value of b plus d is sufficient to provide a viscosity at 25° C. of from 100 millipascal-seconds to 100 pascal-seconds for the Component (A).

14. A composition according to claim 13 wherein Component (B) is a substantially linear organopolysiloxane having the formula $YR_2SiO(Me_2SiO)_p(MeHSiO)_qSiR_2Y$ wherein R is as defined in claim 13, each Y denotes, independently, R or H and p and q have average values such that the value of p plus q is sufficient to provide a viscosity at 25° C. of from 1 to 100 millipascal-seconds for Component (B).

15. A composition according to claim 14 wherein the ratio of the number of silicon-bonded hydrogen atoms to the number of silicon-bonded vinyl radicals plus silicon-bonded hydroxyl radicals has a value of from $\frac{1}{2}$ to 1.5/1.

16. A composition according to claim 15 wherein the platinum group metal-containing catalyst component is a platinum-containing catalyst component.

17. A composition according to claim 16 wherein the hydrocarbonoxyalkyl maleate is selected from the group consisting of bis(2-alkoxyethyl) maleates, bis(2-alkoxyethoxyethyl) maleates and bis(2-alkoxyisopropyl) maleates.

18. A composition according to claim 17 wherein the hydrocarbonoxyalkyl maleate is bis(2-methoxyisopropyl) maleate.

19. A composition according to claim 18 wherein Component (A) has the formula $HOMe_2SiO(Me_2SiO)_bSiMe_2OH$ and Component (B) has the formula $Me_3SiO(MeHSiO)_{35}SiMe_3$.

20. A composition according to claim 18 wherein Component (A) has the formula $ViMe_2SiO(Me_2SiO)_b(MeViSiO)_{0.02b}SiMe_2Vi$ and Component (B) has the formula $Me_3SiO(MeHSiO)_{35}SiMe_3$.

21. A process for rendering a solid surface less adherent to materials that normally adhere thereto, said process comprising
(I) applying to said solid surface a coating of a liquid curable composition comprising
(A) a substantially linear organopolysiloxane component containing at least two silicon-bonded radicals per molecule thereof selected from the group consisting of vinyl radicals and hydroxyl radicals and having the formula $X_2RSiO(Me_2SiO)_b(MeViSiO)_dSiRX_2$ wherein Me denotes methyl, Vi denotes vinyl, each R denotes, independently, an aliphatically saturated monovalent radical having from 1 to 20 carbon atoms selected from the group consisting of hydrocarbon radicals and halohydrocarbon radicals, each X denotes, independently, a monovalent radical selected from the group consisting of R radicals, vinyl radicals and hydroxyl radicals and b and d have average values such that the value of b plus d is sufficient to provide a viscosity at 25° C. of from 100 millipascalseconds to 100 pascal-seconds for Component (A), (B) a substantially linear organopolysiloxane component containing at least two silicon-bonded hydrogen atoms per molecule thereof and having the formula $YR_2SiO(Me_2SiO)_p(MeHSiO)_qSiR_2Y$ wherein each Y denotes, independently, R or H, R is as denoted above, and p and q have average values such that the value of p plus q is sufficient to provide a viscosity at 25° C. of from 1 to 100 millipascal-seconds for Component (B), (C) an amount of a platinum-containing catalyst component sufficient to accelerate a reaction of said silicon-bonded vinyl and/or hydroxyl radicals with said silicon-bonded hydrogen atoms at room temperature, and (D) an amount of a hydrocarbonoxyalkyl maleate sufficient to retard said reaction at room temperature, but insufficient to prevent said reaction at elevated temperature, said hydrocarbonoxyalkyl maleate having the formula

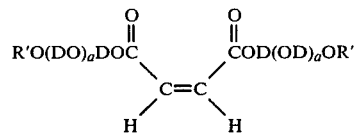

wherein each R' denotes, independently, a monovalent hydrocarbon radical having from 1 to 6 carbon atoms, each D denotes, independently, an alkylene radical having from 2 to 4 carbon atoms and each a has an average value of from 0 to about 5, the amounts of Components (A) and (B) being sufficient to provide a ratio of the number of silicon-bonded hydrogen atoms to the number of silicon-bonded vinyl radicals plus silicon-bonded hydroxyl radicals of from ½ to 1.5/1, and (II) heating the applied coating for a period of time sufficient to cure the applied coating.

22. A process according to claim 21 wherein the solid surface is paper.

23. A process according to claim 22 further comprising (III) applying a pressure sensitive adhesive composition to the cured applied coating.

24. A process according to claim 22 wherein the hydrocarbonoxyalkyl maleate is selected from the group consisting of bis(2-alkoxyethyl) maleates, bis(2-alkoxyethoxyethyl) maleates and bis(2-alkoxyisopropyl) maleates.

25. A process according to claim 22 wherein the hydrocarbonoxyalkyl maleate is bis(2-methoxyisopropyl) maleate.

26. A process according to claim 24 wherein Component (A) has the formula $HOMe_2SiO(Me_2SiO)_bSiMe_2OH$ and Component (B) has the formula $Me_3SiO(MeHSiO)_{35}SiMe_3$.

27. A process according to claim 24 wherein Component (A) has the formula $ViMe_2SiO(Me_2SiO)_b(MeViSiO)_{0.02b}SiMe_3$ and Component (B) has the formula $Me_2SiO(MeHSiO)_{35}SiMe_3$.

28. A process according to claim 24 wherein the platinumcontaining catalyst is a tetramethyldivinyldisiloxane complex of chloroplatinic acid and is present in an amount sufficient to provide from 50 to 500 parts of platinum per million parts of Component (A) plus Component (B).

* * * * *

UNITED STATES PATENT AND TRADEMARK OFFICE
CERTIFICATE OF CORRECTION

PATENT NO. : 4,562,096
DATED : December 31, 1985
INVENTOR(S) : Peter Y. K. Lo, LeRoy E. Thayer and Antony P. Wright It is certified that error appears in the above-identified patent and that said Letters Patent is hereby corrected as shown below:

In Col. 7, line 16, " $R_3{}''H_f SiO_{(4-e-f)/2}$ " should read -- $R_e{}''H_f SiO_{(4-e-f)/2}$ --.

In Col. 15, line 38, Example 4, "$CH_3OCH_2CHCH_3$" should read --$CH_3OCH_2\overset{|}{C}HCH_3$--.

Signed and Sealed this

Nineteenth Day of August 1986

[SEAL]

Attest:

DONALD J. QUIGG

Attesting Officer

Commissioner of Patents and Trademarks